(12) United States Patent
Tikka

(10) Patent No.: US 8,808,498 B2
(45) Date of Patent: Aug. 19, 2014

(54) HEAT RECOVERY FROM SPENT COOKING LIQUOR IN A DIGESTER PLANT OF A CHEMICAL PULP MILL

(75) Inventor: Petri Tikka, Kotka (FI)

(73) Assignee: Andritz Inc., Glens Falls, NY (US)

( * ) Notice: Subject to any disclaimer, the term of this patent is extended or adjusted under 35 U.S.C. 154(b) by 520 days.

(21) Appl. No.: 12/718,467

(22) Filed: Mar. 5, 2010

(65) Prior Publication Data
US 2010/0224335 A1  Sep. 9, 2010

(30) Foreign Application Priority Data

Mar. 5, 2009  (FI) ...................................... 20090079

(51) Int. Cl.
*D21C 7/10* (2006.01)
*D21C 11/04* (2006.01)
*D21C 7/00* (2006.01)

(52) U.S. Cl.
CPC *D21C 11/04* (2013.01); *D21C 7/00* (2013.01); *D21C 7/10* (2013.01)
USPC .......................................................... 162/47

(58) Field of Classification Search
CPC ........... D21C 7/10; D21C 11/06; D21C 11/04
USPC ......................................................... 162/47
See application file for complete search history.

(56) References Cited

U.S. PATENT DOCUMENTS

| | | | |
|---|---|---|---|
| 5,635,026 A | 6/1997 | Kettunen et al. | |
| 6,176,971 B1 | 1/2001 | Sun Yu et al. | |
| 6,306,252 B1 | 10/2001 | Ryham | |
| 2007/0131363 A1 | 6/2007 | Kettunen et al. | |
| 2007/0256801 A1* | 11/2007 | Hernesniemi et al. | 162/19 |

FOREIGN PATENT DOCUMENTS

EP  0 477 059 A2  3/1992

OTHER PUBLICATIONS

Grace editor, Alkaline Pulping, 1989, The Joint Textbook Committee of the Paper Industry, vol. 5 Third Edition of Pulp and Paper Manufacture series, p. 167-169.*
Sixta Herbert, Handbook of Pulp, Jan. 30, 2008, Wiley-VCH, p. 366-509.*

* cited by examiner

*Primary Examiner* — Anthony Calandra
(74) *Attorney, Agent, or Firm* — Nixon & Vanderhye P.C.

(57) ABSTRACT

A method for heating white liquor or a mixture of white liquor and another liquid for use in a digester system of a chemical pulp mill, the method including the steps of: producing black liquor in the digester system; extracting black liquor from the digester system, flashing the extracted black liquor and thereby generating flashed black liquor and flash vapor; directing the flash vapor through a heat exchanger to heat a white liquor flowing through the heat exchanger; the flashed black liquor flows to at least one of a heat recovery or evaporation stage, and the heated white liquor flows to the digester system.

17 Claims, 2 Drawing Sheets

HEAT RECOVERY FROM SPENT COOKING LIQUOR IN A DIGESTER PLANT OF A CHEMICAL PULP MILL

RELATED APPLICATION

This application claims priority to Finnish Patent Application 20090079 filed on Mar. 5, 2009, the entirety of which application is incorporated by reference.

BACKGROUND OF THE INVENTION

The present invention relates to a method for recovering heat from spent cooking liquor, such as black liquor, in a digester plant of a chemical pulp mill and for heating white liquor or a mixture of white liquor and another liquid for use in a digester system of the chemical pulp mill.

In a conventional fiberline system with a chip bin where steaming of wood chips or other cellulose material (collectively referred to as "wood chips") occurs, liquid is added to form a slurry, and the slurry is pressurized, in what is typically referred to as the feed system. From the feed system, the pressurized slurry flows to a treatment vessel(s), such as an impregnation vessel, a pre-hydrolysis process and a digester, in a cooking system for the wood chips.

At least one black liquor stream (typically at a temperature of 110-150° C.) is withdrawn from the conventional cooking system. The extracted black liquor stream(s) is used as a source of heat to "pre-heat" white liquor, other black liquor streams or other liquid streams in the feed and cooking systems. The extracted black liquor stream(s) is then sent to the pre-evaporation system, e.g., two or more flash tanks where steam is produced from the hot black liquor as the liquor is cooled, typically to temperatures of approximately 95-110° C. At this point, the black liquor is sent to the evaporator system in the recovery area. The flash steam is typically used directly to presteam chips prior to cooking.

Steam or vapor is needed for heating the fibrous material to the cooking temperature in the vapor phase of the digester and heating different liquids, such as cooking liquor, white liquor, to a temperature required by the process.

Cooking liquor, such as white liquor, is typically heated by passing it into indirect heat exchange relationship with hot black liquor extracted from a digester or with steam. U.S. Pat. No. 5,635,026 and EP 477,059, for instance, disclose systems in which white liquor added to a digester is heated in an indirect heat exchanger by steam or with hot spent cooking liquor extracted from the digester.

A system is revealed in U.S. Pat. No. 6,176,971 for the generation of clean steam to be used in the digester system. Substantially clean useable steam is produced from a hot spent treatment liquor (e.g. black liquor) by passing the spent liquor to a reboiler, and then pressurizing (e.g. with an eductor, fan, or compressor) the clean steam discharged from the reboiler. The quantity of clean steam produced is increased by placing under negative pressure the clean steam side of the steam converter in the steam converter with a steam-driven ejector. The reduced pressure of the clean steam side ensures that more heat can be withdrawn from the black liquor, which in itself gives a greater quantity of steam, while the supply of steam to the ejector also contributes to the delivery of greater quantities of steam.

A further process for the generation of steam is revealed in U.S. Pat. No. 6,306,252, where the black liquor from the digester is led through a heat exchanger in which e.g. clean process water is heated, after which the pressure of the heated process water is reduced in a flash tank, such that clean steam is generated. The steam can be used for presteaming wood chips or for indirect preheating of cooking liquors or filtrates that are used in and around a digester, for example, white liquor. According to one embodiment of U.S. Pat. No. 6,306,252 black liquor from a continuous digester passes through one or two boilers in which clean liquid, such as condensate, is boiled for generating steam. The black liquor exits the boiler and is further cooled in a cooler in which the coolant may be white liquor, black liquor or green liquor.

US Patent Application Publication 2007/0131,363 discloses a method which comprises generating black liquor in a digester system, sending the black liquor to an evaporator system without using any pre-evaporator system, flashing the black liquor in the evaporator system to yield steam. At least some of the flashed steam is used for chip steaming in a chip bin and/or for supplying in-direct heat exchangers in the digester system for pre-heating white liquor and/or filtrates for use in the digester system.

Conventional solutions provide different systems for preheating white liquor and filtrates for use in the digester system and for improving the energy economy of the pulp mill. In the known systems fresh steam from the mill's turbine plant is often used for this purpose. Due to the cost of energy, any further improvement to the energy efficiency of the chemical pulp mill is needed. The heat content of hot black liquor extracted from a digester could also be used in more efficient ways and the properties of the black liquor could be improved so that the liquor is in a better form for further treatment, such as for evaporation in the mill's recovery plant.

BRIEF DESCRIPTION OF THE INVENTION

An improved and alternative method and system have been conceived for utilization of the heat from black liquor for heating white liquor or a mixture of white liquor and other any liquid used for treating fibrous material in the digester system. Heat is recovered from black liquor so that the treated black liquor has better properties as regards the further treatment in the recovery process of the pulp mill. The recovery of heat improves the energy economy of the pulp mill.

A method is disclosed herein for heating white liquor or a mixture of white liquor and another liquid for use in a digester system of a chemical pulp mill, includes steps in which:
 a) black liquor is produced in the digester system,
 b) a stream of black liquor is extracted from the digester
 c) the extracted black liquor is flashed to generate flashed black liquor and flash vapor,
 d) the flash vapor is passed into indirect heat exchange contact in at least one heat exchanger with white liquor or a mixture of white liquor and another liquid to heat the white liquor or the mixture for use in the digester system, and
 e) the flashed black liquor from step c) is led to further heat recovery or evaporation.

The white liquor entering the digester or liquor circulation (s) of the digester is heated indirectly in a white liquor heater (s) using flashed black liquor. The white liquor flow entering the heater may also be a mixture of white liquor and any other liquid needed in the cooking process. The flash vapour may be condensed in a white liquor heater(s).

Other liquid for forming a mixture with the white liquor may be black liquor or filtrate from pulp washing. The heated white liquor or mixture may flow to a liquor circulation(s) of the digester. A first heat exchanger may transfer heat energy from the flashed black liquor to white liquor entering a liquor circulation in the digester. A second heat exchanger may transfer heat energy from the flashed black liquor to heating the white liquor flowing to the top of the digester. Heat may be recovered from the extracted black liquor in a liquid-to-liquid heat exchanger into a liquid needed at the digester plant.

The flashed black liquor can be sent to the recovery plant of the mill, where it is evaporated and burned. The flashed liquor may also be sent to further heat recovery, used to pretreat wood chips or used where needed in the fiberline.

A method is disclosed for heating white liquor or a mixture of white liquor and another liquid for use in a digester system of a chemical pulp mill, the method including the steps of: producing black liquor in the digester system; extracting black liquor from the digester system, flashing the extracted black liquor and thereby generating flashed black liquor and flash vapor; directing the flash vapor through a heat exchanger to heat a white liquor flowing through the heat exchanger; the flashed black liquor flows to at least one of a heat recovery or evaporation stage, and the heated white liquor flows to the digester system.

A system for heating white liquor is disclosed comprising: a digester system in a chemical pulp mill; a screen and pipe assembly in the digester system through which flows black liquor extracted from the digester system; a flash tank in fluid communication with the screen and pipe assembly to receiving the extracted and the flash tank having a flashed black liquor output and a flash vapor output; a heat exchanger having a first inlet and a first flow passage in fluid communication with the flash vapor output to receive and pass the flash through the heat exchanger, and a second inlet and a second flow passage in fluid communication with a source including white liquor, wherein heat from the flash vapor flows to the white liquor in the heat exchanger and the white liquor from the heat exchanger flows to the digester system, and at least one of a heat recovery stage and an evaporation stage in fluid communication with the flashed black liquor output and receiving the flash black liquor output. The heat exchanger may include a first heat exchanger, and a second heat exchanger adds heat energy extracted from the flash vapor to heat a second stream of white liquor. Heated white liquor may flow from the first heat exchanger to a liquor circulation of the digester vessel, and the heated second stream of white liquor enters a top of the digester vessel. A liquid-to-liquid heat exchanger may be in fluid communication with the screen and pipe assembly and having a black liquor output in fluid communication to an input to the flash tank.

Foul condensate formed from the flash vapor in the heat exchanger(s) is preferably sent to the evaporator plant of the mill where it is treated in a way known per se. A noncondensable gas (NCG) stream formed in the heat exchanger(s) is preferably led to the NCG system of the mill.

DETAILED DESCRIPTION OF THE INVENTION

Figure 1:
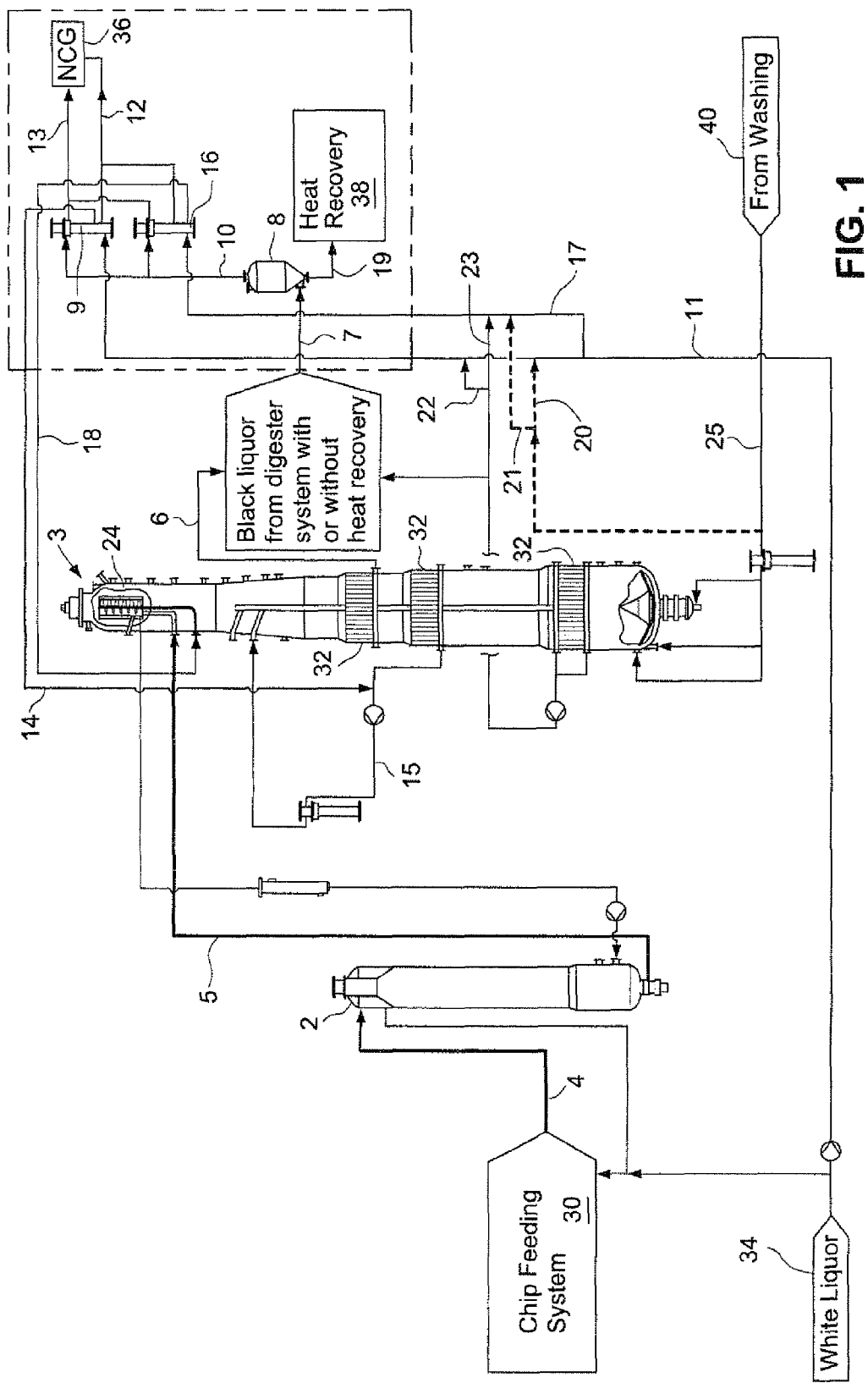
FIG. 1 is a schematic illustration of a system for generating vapor in a digester plant and treating black liquor to improve heat efficiency of the mill having the digester plant.

FIG. 1 illustrates a portion of a fiberline system, e.g., a pulp mill, and, particularly, a system that generates vapor in a digester plant and treats black liquor to enhance the heat efficiency of the mill. The fiberline system may comprises a chip feeding system 30 that includes a chip bin which steams wood chips or other cellulose material (collectively referred to as "wood chips"). In the chip feeding system, liquid is added to the wood chips to form slurry and the slurry is pressurized.

The pressurized slurry may be fed to pre-treatment vessel (s) 2, such as an impregnation vessel, a pre-hydrolysis process or other pre-treatment vessel. These pre-treatment vessel are optional. The pressurized slurry flowing from the pre-treatment vessel(s) may be further treated in a digester vessel 3. Alternatively, the pressurized slurry may flow directly from the chip feeding system to the digester vessel 3, which may be a continuous digester vessel. The optional pre-treatment vessel and digester vessel are an example of a cooking system. The cooking system may be a one vessel system such as a system having a continuous digester vessel that does not require a separate impregnation vessel. Alternatively, the cooking system may be a series of vessels such as a pre-treatment vessel(s), e.g., a pre-hydrolysis pressurized vessel followed by a continuous digester vessel.

As shown in FIG. 1, the slurry of chips and cooking liquid is fed from the chip feeding system 30 via line 4, e.g., a pipe or other conduit, to the top of the impregnation vessel 2 and further from the bottom of the impregnation vessel to the top of the digester 3 via line 5. Other types of chips steaming or feeding or digester circulations can, of course, be present in the digester system.

At least one black liquor stream (such as at a temperature of 120° C. to 160° C. and at a dry solids content of 12% to 17%) is withdrawn from the cooking system through line 6 and introduced further through line 7 to a flash tank 8. A screen assembly 32 in the digester vessel 3 allows black liquor, e.g., spent cooking liquor, to pass through to the line 6 while wood chips are retained in the vessel. The line 6 may be provided with a liquid-to-liquid heat exchanger 42 for recovering heat from the black liquor into a liquid needed at the digester plant.

Hot black liquor extracted from the digester into line 6 at a temperature of 120-160° C. and at a dry solid content of 12-17% is led to the flash tank 8 where the pressure of the liquor is decreased to produce flash vapor having typically a temperature of 100-130° C. and flashed black liquor, the dry solid content of which can be increased by 2-4% in flashing. One or more black liquor streams withdrawn from the digester through outlets of screen assemblies 32 may flow to the flash tank. The black liquor enters the flash tank and generates flash vapor which is used to heat white liquor. The black liquor may be flashed to a maximum level of flashing.

The flash vapor from the black liquor flash tank 8 is sent to a white liquor heat exchanger 9 through line 10. White liquor 34 is fed through line 11 to the heat exchanger 9 wherein the white liquor is indirectly heated by the flash vapor passing through the flash tank. The preheated white liquor from the flash tank flow via line 14 to join the liquor circulation 15 of the digester 3.

The flash vapor contains volatile compounds, such as sulfur compounds. These com-pounds are passed to a foul condensate and to a non-condensable gas (NCG) stream which are generated in the heat exchanger 9. The foul condensate is sent from the heat exchanger 9 via line 12 to the evaporator plant of the mill where it is treated in a way known per se. The NCG stream is led via line 13 to the NCG system 36 of the mill.

The two-vessel digester system shown in FIG. 1 may include a second heat exchanger 16 to which white liquor is fed via line 17 from line 11. A portion of the flash vapor from the flash tank 8 is introduced into the second heat exchanger 16 where the vapor comes into indirect heat exchange contact with the white liquor from line 17. The heated white liquor is fed from the second heat exchanger 16 via line 18 to the top 24 of the digester 3 for use as cooking liquor.

The flashed black liquor is sent via line 19 to the evaporation plant of the mill where the black liquor is concentrated to a high dry solids content before combustion in a recovery boiler. The flashed black liquor may also be sent to further heat recovery 38, used to pretreat wood chips or used where needed in the fiberline.

Other liquids may be added to the white liquor 34 to be heated in the heat exchanger(s). In FIG. 1, for example, filtrate 40 from pulp washing of the mill flows in line 25. Filtrate may be added via line 20 to the white liquor flowing in line 11 to the heat exchanger 9. Filtrate may also be added via line 21 to the white liquor flowing in line 17 to the heat exchanger 16. Lines 20 and 21 are dotted to indicate that they are optional.

Black liquor extracted from the digester 3 may be fed via lines 22 and 23 to the white liquor streams to be heated. Thus FIG. 1 illustrates also embodiments of the invention in which a mixture of white liquor with extracted black liquor and filtrate is formed and heated according to the invention in the heat exchangers by the black liquor flash vapor.

The second white liquor heat exchanger 16 is may be needed for a two-vessel digester system such as shown in FIG. 1. The pre-treatment impregnation vessel 2 is optional and when omitted the second heat exchanger 16 may be unnecessary.

Figure 2:
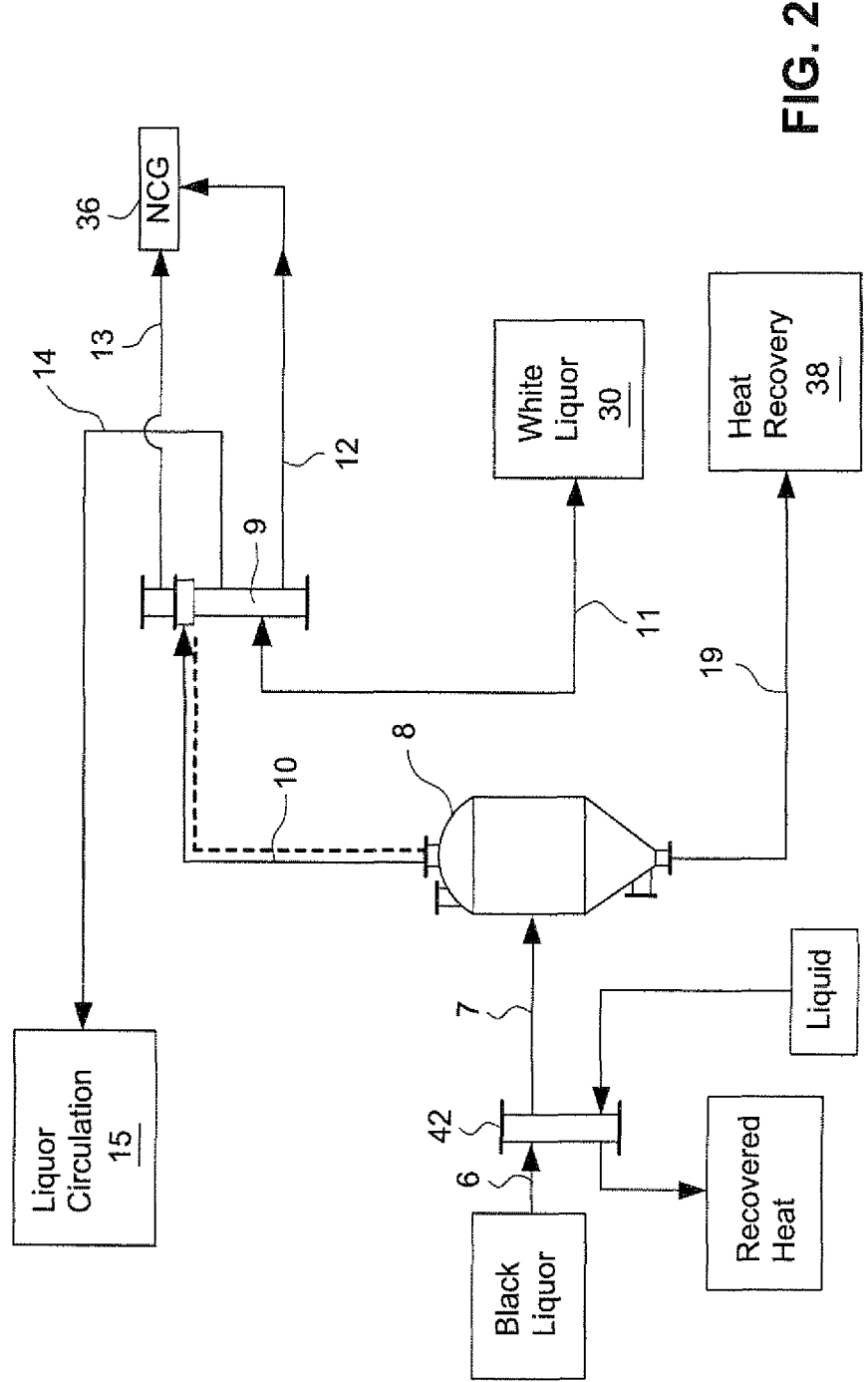
FIG. 2 is a schematic illustration of a flash tank and heat exchanger for the portion of digester plant shown in FIG. 1 marked by a dotted line box.

FIG. 2 shows an alternative embodiment in which the black liquor flash vapor is used in a white liquor heat exchanger 9. The digester is an one-vessel system and there is no impregnation vessel upstream of the digester.

Hot black liquor extracted from the digester is led via line 7 to the flash tank 8 where the pressure of the liquor is decreased to produce flash vapor. The flash vapor from the black liquor flash tank 8 is sent through line 10 to a white liquor heat exchanger 9. The heat of the flash vapor in line 10 is recovered in a heat exchanger 9 where the vapor is passed into indirect heat exchange relationship with white liquor from line 11. The liquid to be heated may also be a mixture of white liquor and any other liquid needed in the digester. The heated white liquor or the mixture is led via line 14 to a liquor circulation or liquor circulations of the digester.

Foul condensate formed in the heat exchanger is sent via line 12 to the evaporator plant of the mill where it is treated in a way known per se. A NCG stream formed in the heat exchanger is led via line 13 to the NCG system of the mill.

The system disclosed herein may be employed to achieve advantages such as:

A. Improved heat efficiency of the mill and an associated increase in the dry solid content of the black liquor which is led to the evaporation plant. Increased dry solid content is a consequence of flashing the black liquor. The steam consumption and capacity demand for steam will decrease in the evaporation plant of the mill.

B. Reduced investment cost of the evaporation plant due to the lower capacity demand for steam.

C. Improved methanol recovery of the mill wide system because the first fractions of water evaporated from black liquor shall be condensed in a dedicated heat exchanger(s). In this process the flash vapor the methanol content of which is high is condensed in a dedicated separate heat surface, e.g., the white liquor heat exchanger(s) to produce foul condensate which is recovered. Treatment of the foul condensate having high methanol content is more advantageous than that of a weak foul condensate which is formed if the black liquor flash vapor is mixed with vapors having low methanol content.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for heating white liquor or a mixture of white liquor and another liquid for use in a pressurized vessel in a digester system of a chemical pulp mill, the method comprising:
    a) producing black liquor in the pressurized vessel;
    b) extracting black liquor from a first liquid extraction screen of the vessel,
    c) flashing the extracted black liquor and thereby generating flashed black liquor and flash vapor,
    d) directing the flash vapor to a first heat exchanger and a second heat exchanger,
    e) transferring heat energy from the flash vapor in the first heat exchanger to white liquor flowing through the first heat exchanger and feeding the heated white liquor from the first heat exchanger to a first white liquor inlet to the vessel,
    f) transferring the heat energy from the flash vapor in the second heat exchanger to white liquor flowing through the second heat exchanger and feeding the heated white liquor from the second heat exchanger to an upper inlet region of the vessel which is above the first white liquor inlet, and
    g) the flashed black liquor flows to at least one of a heat recovery or evaporation stage.

2. A method according to claim 1, wherein filtrate extracted through a second liquid extraction screen from pulp washing in the vessel flows with the white liquor through the first heat exchanger.

3. A method according to claim 1 wherein the first heat exchanger is a single heat exchanger and the white liquor flowing through the first heat exchanger is heated in the single heat exchanger.

4. A method according to claim 3, wherein the first white liquor inlet feeds the heated white liquor to a liquor circulation in the vessel.

5. A method according to claim 1 wherein the upper region is an upper inlet region of the vessel and the heated second stream of white liquor enters the upper inlet region of the vessel.

6. A method according to claim 1 including recovering heat from the extracted black liquor in a liquid-to-liquid heat exchanger before the black liquor is flashed.

7. A method to heat white liquor including:
    producing black liquor in a pressurized digester vessel;
    extracting the black liquor from the pressurized digester vessel;
    flashing the extracted black liquor and thereby generating flashed black liquor and flash vapor;
    directing the flash vapor through a first heat exchanger to heat white liquor flowing through the first heat exchanger and feeding the heated white liquor from the first heat exchanger to a first white liquor inlet of the pressurized digester vessel;
    directing the flash vapor through a second heat exchanger to heat white liquor flowing through the second heat exchanger and feeding the heated white liquor from the second heat exchanger to a second white liquor inlet of the pressurized digester vessel, wherein the second white liquor inlet is above the first white liquor inlet, and the flashed black liquor flows to at least one of a heat recovery or evaporation stage.

8. A method according to claim 7, wherein filtrate extracted from pulp washing in the digester vessel is added to the white liquor and flows with the white liquor through the first heat exchanger.

9. A method according to claim 7 wherein the first heat exchanger is a single heat exchanger and the white liquor flowing into the first heat exchanger is heated in the single heat exchanger.

10. A method according to claim 9 wherein the first white liquor inlet feeds the heated white liquor a liquor circulation in the digester vessel.

11. A method according to claim 9 wherein the heated second stream of white liquor flows through the second white liquor inlet to an upper inlet of the digester vessel.

12. A method according to claim 7 including recovering heat from the extracted black liquor in a liquid-to-liquid heat exchanger before the black liquor is flashed.

13. A system for heating white liquor comprising:
a cooking system in a chemical pulp mill including a pressurized vessel for pretreatment or digesting of cellulosic material;
a first screen and pipe assembly in the cooking system through which flows black liquor extracted from the cooking system;
a flash tank in fluid communication with the screen and pipe assembly to receive the extracted and the flash tank having a flashed cooking liquor output and a flash vapor output;
a first heat exchanger having a first inlet and a first flow passage in fluid communication with the flash vapor output to receive and pass the flash vapor through the first heat exchanger, and a second inlet and a second flow passage in fluid communication with a source including white liquor, wherein heat from the flash vapor flows to the white liquor in the first heat exchanger and the white liquor from the first heat exchanger flows to a first white liquor inlet to the cooking system;
a second heat exchanger having a first inlet and a first flow passage in fluid communication with the flash vapor output to receive and pass the flash vapor through the second heat exchanger, and a second inlet and a second flow passage in fluid communication with the source including white liquor, wherein heat from the flash vapor flows to the white liquor in the second heat exchanger and the white liquor from the second heat exchanger flows to a second white liquor inlet to the cooking system, wherein the second white liquor inlet is above the first white liquor inlet;
at least one of a heat recovery stage and an evaporation stage in fluid communication with the flashed cooking liquor output and receiving the flashed cooking liquor output, and
a second screen and pipe assembly in the cooking system through which flows wash filtrate extracted from the vessel, and the second screen and pipe assembly is at a lower elevation than is the first screen and pipe assembly.

14. A system according to claim 13 wherein the white liquor from the first heat exchanger flows through the first white liquor inlet to a liquor circulation of the vessel, and the heated white liquor from the second heat exchanger flows through the second white liquor inlet and enters a top separator of the vessel.

15. A system according to claim 13 including a liquid-to-liquid heat exchanger in fluid communication with the screen and pipe assembly and having a cooking liquor output in fluid communication to an input to the flash tank.

16. A method for heating white liquor or a mixture of white liquor and another liquid for use in a digester system of a chemical pulp mill, the method comprising:
a) black liquor is produced in the digester system;
b) a stream of black liquor is extracted from the digester system;
c) the extracted black liquor is flashed to generate flashed black liquor and flash vapor;
d) the flash vapor is passed into indirect heat exchange contact in a first heat exchanger and a second heat exchanger with white liquor or a mixture of white liquor and another liquid to heat the white liquor or the mixture for use in the digester system, wherein the heated white liquor or mixture from the first heat exchanger is led to a liquor circulation of the digester system, and the heated white liquor or mixture from the second heat exchanger is led to the top of the digester system, and
e) the flashed black liquor from step c) is led to further heat recovery or evaporation.

17. A method according to claim 16, wherein in step d) another liquid for forming a mixture with the white liquor is black liquor or filtrate from pulp washing.

* * * * *